US012633818B2

(12) United States Patent
    Woestyn

(10) Patent No.:   US 12,633,818 B2
(45) Date of Patent:       May 19, 2026

(54) BATTERY PACK CONTROLLER AND CONTROL METHOD

(71) Applicant: SEMICONDUCTOR COMPONENTS INDUSTRIES, LLC, Phoenix, AZ (US)

(72) Inventor: Pierre Jacques Marie Bernadette Woestyn, Oudenaarde (BE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 784 days.

(21) Appl. No.: 18/062,903

(22) Filed: Dec. 7, 2022

(65) Prior Publication Data

US 2024/0195286 A1      Jun. 13, 2024

(51) Int. Cl.
    *H02M 1/32*          (2007.01)
    *H01M 10/42*         (2006.01)
    (Continued)

(52) U.S. Cl.
    CPC ......... *H02M 1/32* (2013.01); *H01M 10/4207* (2013.01); *H01M 10/425* (2013.01);
    (Continued)

(58) Field of Classification Search
    CPC ........................ H01M 10/4207; H01M 10/425
    (Continued)

(56) References Cited

U.S. PATENT DOCUMENTS

| | | | |
|---|---|---|---|
| 8,222,869 B2 * | 7/2012 | Li | H02J 7/00711 |
| | | | 320/159 |
| 2011/0140673 A1 * | 6/2011 | Zhang | H02J 7/00306 |
| | | | 320/145 |

(Continued)

FOREIGN PATENT DOCUMENTS

| | | |
|---|---|---|
| KR | 20070090424 A | 9/2007 |
| KR | 20130086562 A | 8/2013 |

OTHER PUBLICATIONS

Kamala Kumari Duru et al., "Critical Insights Into Fast Charging Techniques for Lithium-Ion Batteries in Electric Vehicles," IEEE Transactions on Device and Materials Reliability, vol. 21, No. 1, Mar. 2021, pp. 137-152.

(Continued)

*Primary Examiner* — Nathaniel R Pelton
(74) *Attorney, Agent, or Firm* — Ramey LLP

(57)                    ABSTRACT

Enhanced battery pack controllers and control methods are disclosed. One illustrative battery pack controller includes: a monitor circuit that couples to a battery pack load terminal to detect when a voltage of the battery pack load terminal indicates a load condition; a fault detection circuit that couples to a current path through an array of one or more battery cells to detect when a current indicates a fault condition; a switch control circuit that selectively de-asserts a discharge transistor control pin, asserts the discharge transistor control pin, and ramps a voltage or current of the discharge transistor control pin in an open loop fashion for at least 10 ms; and a status detection circuit that in the (Continued)

absence of a fault condition causes the switch control circuit to perform said ramping responsive to detection of the load condition while the discharge transistor control pin is de-asserted.

26 Claims, 3 Drawing Sheets

(51) Int. Cl.
  *H02H 1/04*          (2006.01)
  *H02M 1/36*          (2007.01)
(52) U.S. Cl.
  CPC .............. *H02H 1/043* (2013.01); *H02M 1/36* (2013.01); *H01M 2010/4271* (2013.01)
(58) Field of Classification Search
  USPC ........................................................ 320/136
  See application file for complete search history.

(56)                    References Cited

U.S. PATENT DOCUMENTS

| | | | |
|---|---|---|---|
| 2011/0234177 A1 | 9/2011 | Kohara et al. | |
| 2020/0076209 A1* | 3/2020 | Takeda ................. | H01M 10/48 |
| 2020/0144841 A1* | 5/2020 | Baruzzi ............... | H02J 7/00714 |
| 2020/0395846 A1* | 12/2020 | Anzai ....................... | H02J 7/06 |

OTHER PUBLICATIONS

Analog Devices, "LTC4231 Micropower Hot Swap Controller," Rev. B, 22 pages.

* cited by examiner

BATTERY PACK CONTROLLER AND CONTROL METHOD

TECHNICAL FIELD

The present disclosure relates to enhanced controllers and control methods for battery packs, and more particularly to such controllers and methods that enable pre-discharge (aka "soft-start") and/or pre-charge (aka "trickle charge") operation while minimizing external component requirements.

BACKGROUND

An increasing range of technologies incorporate or support the use of battery packs, including automobiles, mobile phones, computers, earphones, headsets, household appliances, power tools for the workshop and yard, and indeed nearly every electronic device. To provide increased safety, convenience, and longevity, such battery packs often include integrated controllers. The most rudimentary of such controllers merely provide a "charge status" indicator, but there exists a desire for more sophisticated controllers that provide additional features without significantly increasing manufacturing cost.

SUMMARY

Accordingly, there are disclosed herein enhanced battery pack controllers and control methods. One illustrative battery pack controller includes: a monitor circuit that couples to a battery pack load terminal to detect when a voltage of the battery pack load terminal indicates a load condition; a fault detection circuit that couples to a current path through an array of one or more battery cells to detect when a current indicates a fault condition; a switch control circuit that selectively de-asserts a discharge transistor control pin, asserts the discharge transistor control pin, and ramps a voltage or current of the discharge transistor control pin in an open loop fashion for at least 10 ms; and a status detection circuit that in the absence of a fault condition causes the switch control circuit to perform said ramping responsive to detection of the load condition while the discharge transistor control pin is de-asserted.

An illustrative battery pack control method includes: monitoring a current path through an array of one or more battery cells for a fault condition; monitoring a battery pack load terminal to detect when a voltage of the battery pack load terminal indicates a load condition; and responsive to detecting the load condition and in the absence of a fault condition, asserting a discharge transistor control pin after ramping a voltage or current of a discharge transistor control pin for at least 100 ms.

Another illustrative battery pack controller includes: a positive power pin that couples to a positive terminal of an array of one or more battery cells; a negative power pin that couples to a negative terminal of an array of one or more battery cells; an input pin that couples to a battery pack load terminal; a bypass path that couples the input pin to one of said positive power pin and said negative power pin; a switch control circuit that selectively de-asserts and asserts a discharge transistor control pin and selectively disables and enables the bypass path, the discharge transistor control pin coupling to a base or gate of a discharge transistor coupled between the battery pack load terminal and a terminal of the array; and a status detection circuit that causes the switch control circuit to enable the bypass path before asserting the discharge transistor control pin.

Another illustrative battery pack control method includes: monitoring a battery pack load terminal via a load monitor pin to detect when a voltage of the battery pack load terminal indicates a load condition; and responsive to detecting the load condition, asserting a discharge transistor control pin after first enabling a bypass path between the load monitor pin and a power pin coupled to a terminal of an array of one or more battery cells.

Each of the foregoing embodiments may be employed individually or conjointly, and they may further employ one or more of the following optional features in any suitable combination: 1. the status detection circuit causes the switch control circuit to de-assert the discharge transistor control pin when the fault condition is detected. 2. the switch control circuit ramps the voltage or current by charging or discharging a capacitance via a resistance. 3. the switch control circuit ramps the voltage or current by charging or discharging a capacitance using a current source or current sink. 4. the monitor circuit couples via a charge monitor pin to a battery pack charge terminal that is shared with or separate from the battery pack load terminal to detect when a voltage of the battery pack charge terminal indicates a charge condition. 5. the switch control circuit selectively de-asserts a charge transistor control pin, asserts the charge transistor control pin, and partially asserts the charge transistor control pin for at least 30 s. 6. responsive to the detection of the charge condition, the status detection circuit causes the switch control circuit to partially assert the charge transistor control pin if the array of one or more battery cells is depleted and otherwise causes the switch control circuit to assert the charge transistor control pin. 7. the switch control circuit uses a charge pump to generate a drive voltage for asserting or partially asserting the charge transistor control pin. 8. the status detection circuit uses a feedback loop to regulate the drive voltage for partially asserting the charge transistor control pin. 9. de-asserting the discharge transistor control pin when the fault condition is detected. 10. said ramping includes charging or discharging a capacitance via a resistance. 11. said ramping includes charging or discharging a capacitance using a current source or current sink. 12. monitoring a battery pack charge terminal which may be shared with or separate from the battery pack load terminal to detect when a voltage of the battery pack charge terminal indicates a charge condition. 13. responsive to detecting the charge condition, partially asserting a charge transistor control pin if the array of one or more battery cells is depleted and otherwise asserting the charge transistor control pin. 14. a fault detection circuit that couples to a current path through the array to detect when a current indicates a fault condition. 15. the status detection circuit causes the switch control unit to de-assert the discharge transistor control pin and disable the bypass path when the fault condition is detected. 16. the status detection circuit causes the switch control circuit to enable the bypass path a predetermined time before asserting the discharge transistor control pin. 17. the predetermined time is at least 100 ms. 18. the bypass path includes a transistor, and the switch control circuit enables the bypass path by providing a ramp signal to a base or gate of the bypass path transistor. 19. the input pin is a load monitor pin used by a monitor circuit to detect when a voltage of the battery pack load terminal indicates a load condition. 20. the switch control circuit selectively de-asserts and asserts a charge transistor control pin and selectively disables and enables a second bypass path that couples the charge monitor pin to said one of said positive power pin and said negative power pin. 21. responsive to the detection of the charge condition, the status detection circuit causes the switch control circuit to enable the second bypass path before asserting the charge transistor control pin if the array of one or more battery cells is depleted and otherwise causes the switch control circuit to assert the charge transistor control pin without first enabling the second bypass path.

NOMENCLATURE

The term "pin" is herein used to refer to a terminal of an integrated circuit. Such terminal may be embodied as a lead of a lead frame, as a contact pad (such as in case of a QFN or BGA package), or even as a mechanical pin. The use of the terms "approximately" or "substantially" mean that a value of an element has a parameter that is expected to be close to a stated value. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "first", "second", "next", "last", and other similar terms are used for description and ease of reference purposes only and are not intended to be limiting to any configuration of elements or sequences of operations for the various embodiments of the present disclosure. Further, the terms "coupled", "connected" are not intended to limit interactions and communication of signals between two or more devices, systems, components or otherwise to direct interactions—indirect couplings and connections may also occur.

DETAILED DESCRIPTION

It should be understood that the following description and accompanying drawings are provided for explanatory purposes, not to limit the disclosure. In other words, they provide the foundation for one of ordinary skill in the art to recognize and understand all modifications, equivalents, and alternatives falling within the scope of the claims.

Figure 1:
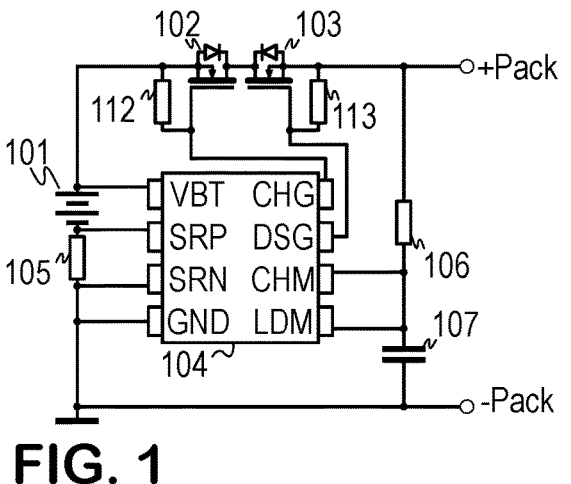
FIG. 1 is a circuit schematic of an illustrative high-side shared terminal controller configuration.
Figure 2:
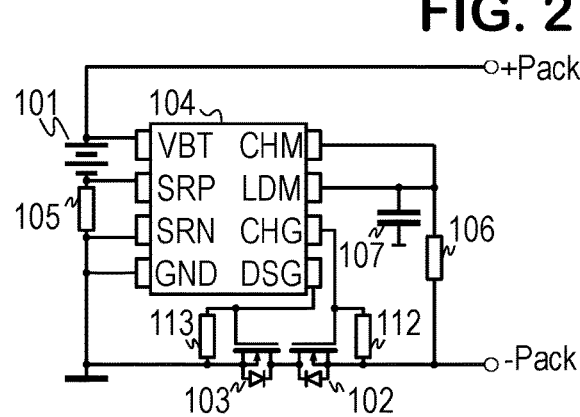
FIG. 2 is a circuit schematic of an illustrative low-side shared terminal controller configuration.

FIG. 1 is a circuit schematic for an illustrative battery pack having an array of one or more battery cells 101 with a series arrangement of power transistors 102, 103 coupling the positive or "high side" terminal of the battery cell array to the battery pack's positive terminal +Pack. Because the transistors control a shared path to the high battery cell array's high side, this configuration is referred to here as a high-side shared terminal controller configuration. Contrast this configuration with the low-side shared terminal controller configuration of FIG. 2, where a series arrangement of power transistors 102, 103 couple the negative or "low side" terminal of the battery cell array to the battery pack's negative terminal −Pack. Contrast each with the high-side split terminal controller configuration of FIG. 3, where the power transistors 102, 103 couple the high side terminal of the battery cell array to separate charge (+Charge) and discharge (+Load) terminals of the battery pack, and to the low-side split terminal controller configuration of FIG. 4, where the power transistors 102, 103 couple the low side terminal of the battery cell array to separate charge (−Charge) and discharge (−Load) terminals of the battery pack.

In each of the figures, the positive terminal of the battery cell array is coupled to a positive power pin VBT of a controller 104 and the negative or "ground" terminal is coupled to the controller's negative power pin GND. The controller 104 may be implemented as a packaged integrated circuit having a minimal number of supporting discrete components such as resistors, capacitors, and the previously-mentioned power transistors 102, 103.

A current-sensing resistor 105 is located in the current path through the battery cell array 101 to facilitate monitoring of current flow. Current flowing to or from the battery cell array 101 produces a voltage drop across resistor 105. To avoid impairing the efficiency of the battery pack, the resistance of resistor 105 may be limited to a few milliohms. Alternative current sensors can be employed if economically feasible. Controller 104 includes positive and negative sensor pins SRP, SRN that couple to the terminals of current-sensing resistor 105. The current-sensing resistor 105 may be coupled to the negative terminal of battery cell array 101 to minimize common mode voltage at the SRP, SRN pins, but this is not a requirement.

Controller 104 uses power transistor 102 to control the flow of a charging current to the battery cell array 101, and uses power transistor 103 to control the flow of a load or "discharge" current from the battery cell array. Power transistors 102, 103 may be N-channel power metal-oxide-semiconductor field effect transistors (nMOSFETs) to provide the best performance, but P-channel MOSFETs, other transistors (e.g., bipolar transistors, junction field effect transistors), or switch technologies can be suitable alternatives. To enable the flow of a charging current, controller 104 asserts the control pin CHG for the charge transistor 102. For a nMOSFET, this assertion is accomplished by driving the voltage high relative to the voltage of the transistor's source terminal. For an NPN transistor, it is accomplished by driving the base voltage high relative to the transistor's emitter terminal. Similarly, controller 104 asserts the control pin DSG for the discharge transistor 103 to enable the flow of a load current. In either case, the other transistor's body diode is oriented to permit the current flow even if the other transistor is not enabled.

For the illustrated high side configurations, the source/emitter terminal of the discharge transistor may be at or above the battery pack voltage, necessitating the use of a depletion mode transistor and/or the use of a charge pump to raise control pin voltage beyond the controller's supply voltage. (An alternative configuration, the power transistors may be coupled in series by their source terminals. In addition to enabling a shared gate terminal, this alternative configuration may reduce the needed control pin voltage.) An optional bleed-off resistor 112 may be provided between the gate and source nodes of charge control transistor 102, and another optional bleed-off resistor 113 may be provided between the gate and source nodes of discharge control transistor 103. The bleed-off resistors 112, 113 may be provided with high resistances, e.g., 10 megaohms, serving primarily to ensure the power transistors are disabled whenever the controller 104 is disabled.

To determine when to enable and disable the power transistors, controller 104 uses a charge monitor pin CHM to detect when a charge condition exists and uses a load monitor pin LDM to detect with a load condition exists. In FIG. 1, both pins are coupled to the positive battery pack terminal +Pack by a resistor 106 and coupled to ground with a capacitor 107, providing electrostatic discharge (ESD) protection while enabling both pins to detect the +Pack terminal voltage. The RC time constant may be chosen based on the desired specification for ESD protection, e.g., 1 microsecond, achievable with a 100 ohm resistor and a 10 nanofarad capacitor. A +Pack terminal voltage above the battery cell array voltage may be detected as a charge condition, whereas a +Pack terminal voltage below the battery cell array voltage may be detected as a load condition.

As mentioned above, high side configurations may require an elevated drive voltage for controlling the power transistors 102, 103. The low side controller configuration in FIG. 2 serves as an alternative that enables the power transistors 102, 103 to be controlled with gate voltages much closer to ground voltage. Note that in this configuration the resistor 106 couples the monitor pins CHM, LDM to the negative battery pack terminal –Pack and the capacitor 107 couples them ground, providing ESD protection while enabling the pins to monitor the –Pack terminal voltage for charge and load conditions. A –Pack terminal voltage that is negative may be detected as a charge condition, whereas a positive –Pack terminal voltage may be detected as a load condition.

The high side configuration of FIG. 1 couples the power transistors 102, 103 in series between the positive terminal of the battery cell array and the positive battery pack terminal +Pack, relying on a shared terminal for both charging and discharging the battery pack. The battery pack has less control over its state of charge in systems employing a shared terminal configuration, being potentially unable to recharge when the system load is active or potentially unable to discharge when a charging condition is present.

Figure 3:
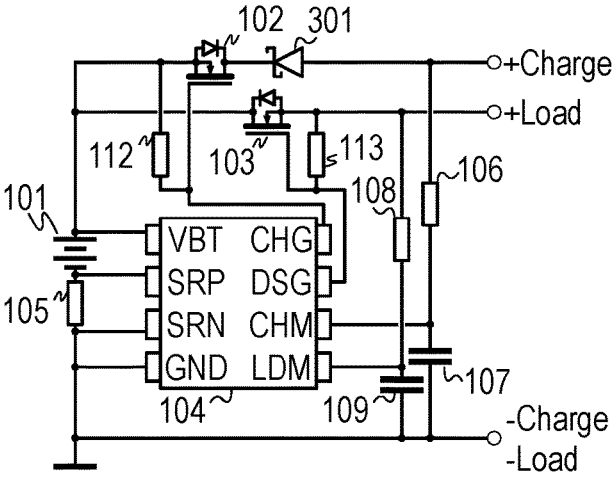
FIG. 3 is a circuit schematic of an illustrative high-side split terminal controller configuration.

As some battery technologies benefit from having increased control over their state of charge, FIG. 3 shows a high side split terminal configuration, with a dedicated positive charge terminal +Charge and a separate positive load terminal +Load. The negative battery pack terminal serves as a shared negative charge terminal –Charge and negative load terminal –Load. The charge transistor 102 couples the +Charge terminal to the positive terminal of battery cell array 101 to enable a charge current to flow when the charge transistor control pin CHG is asserted. An optional diode 301 is provided in series to prevent a current flow through the charge transistor's body diode should the +Charge terminal voltage ever fall below the voltage of the battery cell array. The discharge transistor 103 couples the positive terminal of the battery cell array 101 to the +Load terminal to enable a discharge current to flow when the discharge transistor control pin DSG is asserted.

Resistor 106 couples the charge monitor pin CHM to the +Charge terminal and capacitor 107 couples it to ground, providing ESD protection while enabling the CHM pin to detect the +Charge terminal voltage. Another resistor 108 couples the load monitor pin LDM to the +Load terminal and another capacitor 109 couples it to ground, providing ESD protection while enabling the LDM pin to monitor the +Load terminal voltage.

6

Figure 4:
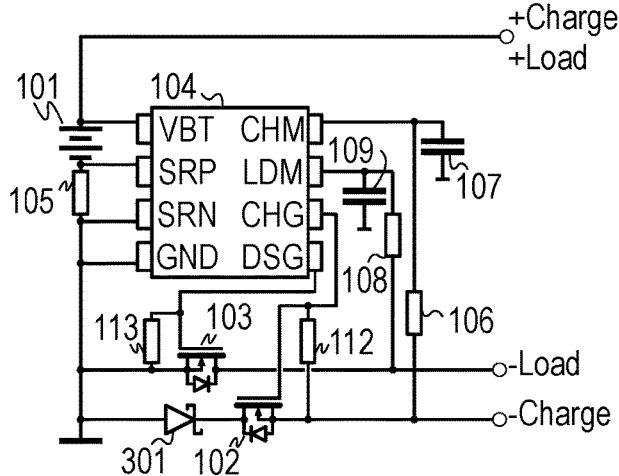
FIG. 4 is a circuit schematic of an illustrative low-side split terminal controller configuration.

FIG. 4 shows a low side split terminal controller configuration having a shared +Charge terminal and +Load terminal, and a negative charge terminal –Charge separate from the negative load terminal –Load. Resistor 106 couples the CHM monitor pin to the –Charge terminal while capacitor 107 couples the CHM monitor pin to ground. Resistor 108 couples the LDM pin to the –Load terminal while capacitor 109 couples it to ground. Charge transistor 102 couples the negative terminal of the battery cell array 101 to the –Charge terminal to enable a charge current to flow when the CHG pin is asserted. A series diode 301 prevents current flow through the charge transistor's body diode should the –Charge terminal voltage rise above the negative terminal voltage of the battery cell array. Discharge transistor 103 couples the –Load terminal to the negative terminal of the battery cell array to enable a discharge current to flow when the DSG pin is asserted.

It is contemplated to provide a controller 104 suitable for use with all four configurations shown in FIGS. 1-4. The controller 104 may be designed to control the charge and discharge operations of the battery pack in a fashion most suitable for the battery cell array technology and the target application of the systems for which the battery pack is designed, for example providing an optimal tradeoff between average battery life per charge and longevity of the battery pack or other performance metrics such as efficiency, recharge time, number of recharge cycles, maximum energy density, etc. The controller 104 may preferably provide additional features such as fault detection, trickle charging (aka pre-charging), and soft start (aka pre-discharging).

The controller 104 may perform fault detection by, e.g., monitoring temperature of the battery cell array, the temperature of the power transistors, the temperature of the controller chip, the voltage of the battery cell array, and/or the voltage of each cell in the battery cell array to ensure that the voltage remains within a predetermined range. Current flow through the battery cell array may be monitored to detect excessive current flows and/or to detect whether the array's internal resistance remains within a predetermined range. The controller 104 may identify any out-of-range values as a fault necessitating a temporary disabling of the battery pack operation or, in an extreme case, disabling the battery pack until it can be repaired.

Certain rechargeable battery technologies such as Li-ion suffer reduced longevity if a maximum rated current is used to recharge them from a deeply-depleted charge state. Batteries using such technologies should first be pre-charged with a reduced current, typically 10% of the maximum rated current, to restore them to a moderate charge state before an elevated current can be used to finish charging the battery. Alternatively, the current may be pulsed on and off, e.g., using a 50% duty cycle at 0.5 Hz. The reduced-current charging process, which is often called trickle-charging, may reduce the formation of dendrites that can internally short-circuit the battery cells. Though such trickle-charging functionality is traditionally incorporated into the battery charging station or host device, incorporating this function into the battery pack enables the pre-charge parameters to be precisely optimized for the battery cell technology and age of that battery pack.

Accordingly, the controller 104 may be configured to detect a deeply depleted charge state and limit the charge current to suitable pre-charge levels until the battery cell array is returned to a moderate state of charge. The expected time for a pre-charge operation may be a relatively slow process, e.g., on the order of minutes or even hours, but in any case would be at least 30 seconds.

When powering a DC-DC converter or any other load having a significant input capacitance, the initial current from the battery pack can be undesirably large. A controller 104 can protect against such inrush currents using a pre-discharge function to gradually ramp up or otherwise limit the initial current until the input capacitance has been sufficiently charged. The expected time for a soft-start operation may be on the order of 100 milliseconds to a few seconds, but in any case would likely be at least 30 milliseconds.

Described below are various controller implementations that among other things provide pre-charge and pre-discharge features. A first of these implementations makes use of the linear or "ohmic" region of the power transistors' characteristic curves to limit current flow during pre-charge and pre-discharge operations. Another of these implementations makes use of one or more bypass paths through the controller, enabling limited current flows to occur before the relevant power transistor is enabled. In either case, the pre-charge and pre-discharge features can be implemented without necessitating any additional pins or components external to the controller, thereby avoiding any increase in component cost or board space requirements.

Figure 5:
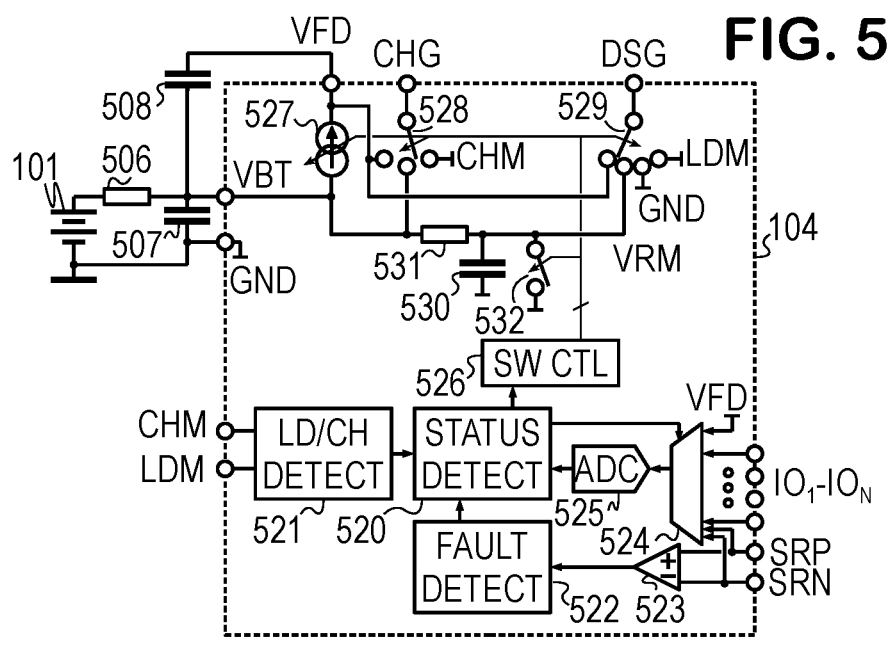
FIG. 5 is a block diagram of a first illustrative battery pack controller.

FIG. 5 shows an illustrative controller 104 coupled to a battery cell array 101. The controller's negative power pin GND may be coupled to the negative terminal of the battery call array 101. The controller's positive power pin VBT may be coupled by a resistor 506 to the positive terminal of the battery cell array 101, with a capacitor 507 between the positive and negative power pins to provide a low-pass filtered supply voltage. An additional capacitor 508 may be coupled to the transistor drive voltage pin VFD to serve as a charge pump buffer.

Within the controller, a status detection circuit 520 receives a charge detection signal and a load detection signal from monitor circuit 521. Monitor circuit 521 includes comparators to determine when the charge monitor pin CHM voltage exceeds the positive power pin voltage VBT or falls below the negative power pin voltage GND, corresponding to an assertion of the charge detection signal. It further includes comparators to determine whether the load monitor pin LDM falls below the VBT voltage or exceeds the GND voltage by more than a predetermined threshold, corresponding to an assertion of the load detection signal.

Status detection circuit 520 further receives a fault detection signal from fault detection circuit 522, which in turn receives a current measurement signal from differential amplifier 523. Differential amplifier 523 is coupled to the positive and negative sensor pins SRP, SRN to amplify the differential voltage, providing the current measurement signal. Fault detection circuit 522 includes a comparator to determine if the current measurement signal exceeds a predetermined threshold representing an upper limit on the battery cell array current, corresponding to an assertion of the fault detection signal.

Controller 104 further includes a multiplexer 524 that provides a selected pin voltage from the available input/output pins $IO_1$-$IO_N$, VFD, SRP, SRN, and optionally other pins, to an analog-to-digital converter ADC 525. The ADC 525 provides the digitized signal voltage of the selected input pin to the status detection circuit 520, enabling the status detection circuit to take the input signal voltages into account when determining battery pack status. Among other things, the battery pack status determines the desired operation of the power transistors 102, 103. Optionally, the status detection circuit 520 incorporates the functionality of the fault detection circuit 522 and additionally monitors the input pins for other faults, e.g., monitoring the VFD pin for switching faults, monitoring the LDM to detect a hard short in the load, monitoring thermistor inputs for temperature faults, etc.

A switch control circuit 526 is coupled to the status detection circuit 520 to detect the battery pack status and to responsively provide control signals.

A charge pump 527 is enabled or disabled by a control signal from the switch control circuit 526 to generate a transistor drive voltage VFD that may exceed the positive power pin voltage VBT. Optionally, a linear regulator may be additionally provided to selectively generate a transistor drive voltage VFD more suitable for low side switching. Status detection circuit 520 may determine whether the controller 104 is configured for high-side or low-side switching based on the voltages of the monitor pins CHM, LDM, may responsively determine a suitable level for the transistor drive voltage VFD, and may optionally provide closed-loop feedback control for the operation of the charge pump 527. In some alternative embodiments, the controller 104 has configuration registers programmable via an SPI bus to set parameters such as the desired VFD level.

To enable the charge transistor, switch control circuit 526 uses internal switch 528 to couple the charge transistor control pin CHG to the transistor drive voltage node VFD. To disable the charge transistor, the internal switch 528 is used to couple the charge transistor control pin to the positive power pin voltage VBT (for high-side switching configurations) or to the charge monitor pin CHM (for low-side switching configurations). To enable the discharge transistor, switch control circuit 526 uses the internal switch 529 to couple the discharge transistor control pin DSG to the transistor drive voltage node VFD or, for pre-discharging, to the ramp voltage node VRM discussed further below. To disable the discharge transistor, the discharge transistor control pin DSG is coupled to the load monitor pin LDM (for high side switching configurations) or to the negative power pin GND (for low side switching configurations). Various suitable implementations are possible for the internal switches, including arrangements of diodes, p-type MOSFETS, and n-type MOSFETs that can be found in the literature and are known to those skilled in the art.

For pre-discharge operation, the controller 104 includes an internal capacitance 530 chargeable via a resistance 531. Switch control circuit 526 controls an internal switch 532 to set the initial voltage of the ramp voltage node VRM to zero before the node is coupled to the discharge control pin DSG. As the capacitance 530 is charged, the voltage of the discharge control pin DSG ramps upward from zero to a target value. In the implementation of FIG. 5, the target value is VBT, the voltage of the positive power pin. Alternatively, the capacitance could be charged from the VFD node. As an alternative to charging the capacitance 530 via a resistor 531, a current source, charge pump, or switched capacitance can be used charge the capacitance. The current source provides a more linear increase in the voltage of the DSG pin, but in any case, the gradual increase in the DSG pin voltage provides a gradual transition of the discharge transistor state from off to ohmic to saturation (fully on), limiting the initial current for charging any load capacitance.

The open-loop fashion in which this ramping of the DSG pin voltage is performed provides for a low-cost, robust implementation. The fault-detection circuit ensures that safety is not compromised. In an alternative implementation, the ramp can be performed using a digital to analog converter to raise the pin voltage in a stepwise fashion. As yet another alternative, a closed feedback loop may be used to ensure the load monitor pin LDM pin voltage follows a digital or analog target voltage that increases in a gradual fashion. Another contemplated alternative uses a closed feedback loop to regulate the current flow, increasing the initial current in a linear or otherwise gradual fashion.

Given the relatively slower pace of the pre-charge operation, a closed loop implementation may be preferred for better current regulation. The switch control circuit 526 may initially set a lower target voltage for VFD to maintain the charge transistor in an ohmic region to limit current flow. The switch control circuit 526 may rely on the current sensed by resistor 105 to determine whether the charge transistor control pin CHG voltage should be raised or lowered to maintain the current at a target level.

Figure 6:
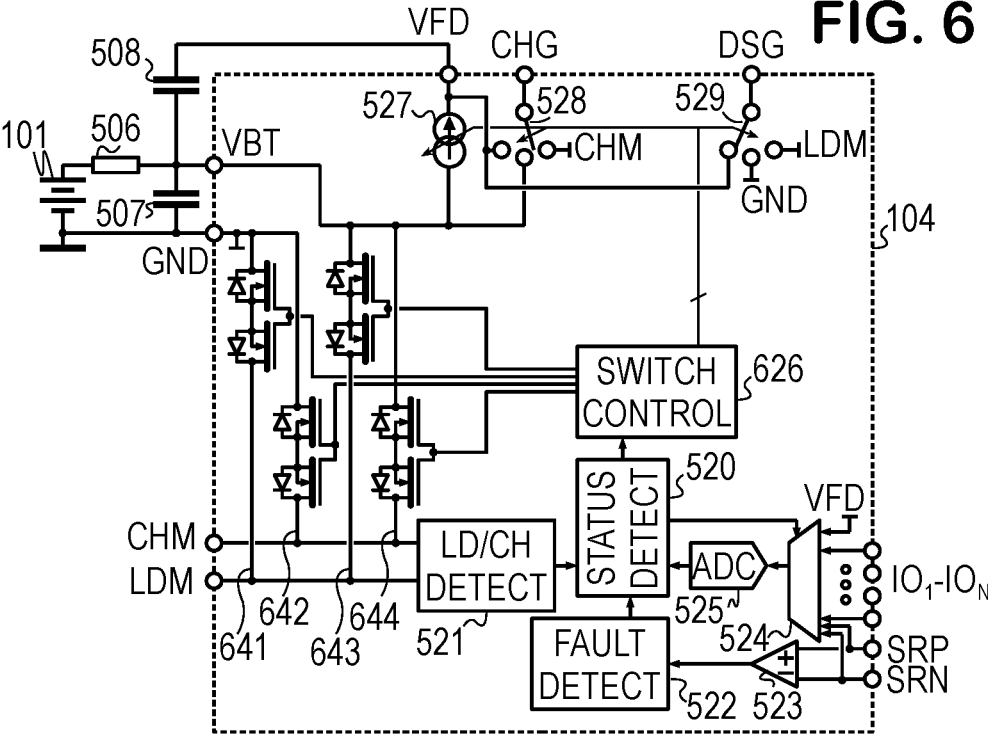
FIG. 6 is a block diagram of a second illustrative battery pack controller.

FIG. 6 show an illustrative controller 104 with a switch control circuit 626 that provides control signals for internal switches 528, 529 to couple the selected voltage to the control pin(s) CHG, DSG. For pre-discharge operation, the switch control circuit 626 controls a bypass path 641 to couple the load monitor pin LDM to the negative power pin GND (for low side switching) and a bypass path 643 to couple the load monitor pin LDM to the positive power pin VBT (for high side switching). For pre-charge operation, the switch control circuit 626 instead controls bypass path 642 to couple the charge monitor pin CHM to the negative power pin GND or bypass path 644 to couple the charge monitor pin CHM to the positive power pin VBT. The illustrated bypass paths each employ a back-to-back transistor pair that the controller 104 can use to bypass the power transistors, providing a reduced current flow prior to enabling the selected transistor. For battery packs with shared terminal configurations, multiple bypass paths can be switched together. Power dissipation during the pre-charge and pre-discharge operations would be shared by the resistors 106, 506, with the back-to-back transistor pairs. The controller 104 may be designed to cope with an increased voltage on the positive power pin VBT during pre-charging and a reduced voltage during pre-discharging.

Figure 7:
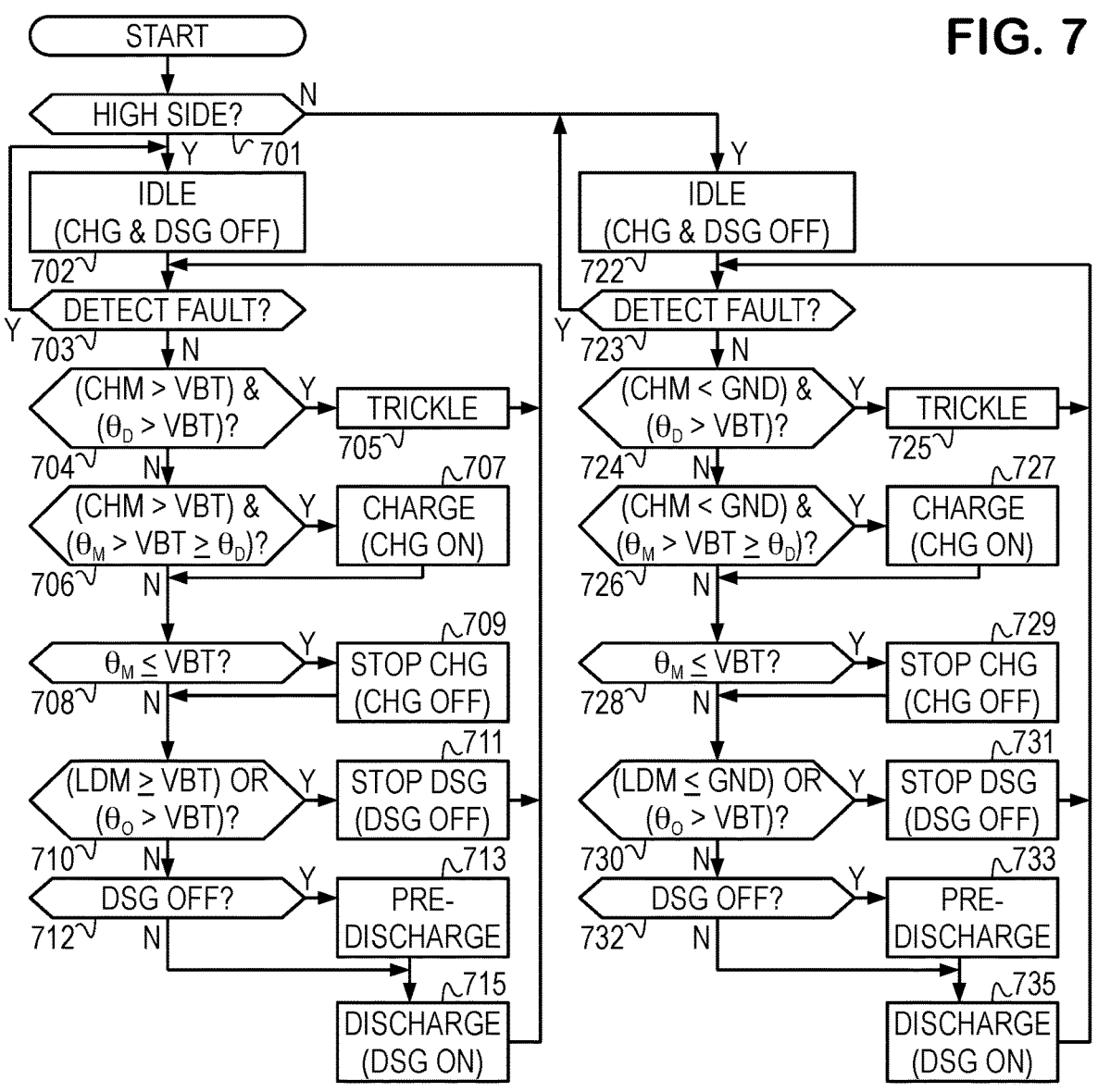
FIG. 7 is a flow diagram of an illustrative battery pack control method.

FIG. 7 is a flow diagram of an illustrative battery pack control method that may be implemented by controller 104 and more specifically by status detection circuit 520. Status detection circuit may be an application specific integrated circuit or a general purpose processor configured with suitable firmware. In block 701, the controller determines whether the battery pack is using a high side switch configuration or a low side switch configuration. This determination may be made based on internal registers or based on the voltage of the monitor pins. The controller loops through blocks 702-715 for high side configurations, blocks 722-735 for low side configurations.

In block 702, the controller begins in an idle state with the charge transistor control pin CHG and discharge transistor control pin DSG disabled. Any bypass paths are also disabled. Block 703 represents any fault (e.g., excessive current flow, excessive temperature) detection by the controller, which returns the controller to the idle state 702. In block 704, the controller determines whether a pre-charge condition exists, e.g., whether a charger is connected and whether any of the battery cell voltages are below the depletion threshold OD. Any suitable method may be used to detect whether the charger is connected, such as a physical switch, sensor, bus communication, or by comparing the CHM pin voltage to the power pin voltage VBT. If the individual cell voltages are not available to the controller, the controller may optionally compare the positive power voltage VBT to a depletion threshold voltage. If a pre-charge condition exists, the controller performs trickle charging in block 705.

Otherwise in block 706, the controller determines whether a charging condition exists, e.g., whether the charger is connected and each of the battery cell voltages are in the range between the depletion threshold Op and the maximum cell voltage OM. If the individual cell voltages are not available to the controller, the controller may use threshold for comparison to the positive power pin voltage VBT. If a charge condition exists, the controller asserts the charge transistor control pin CHG in block 707 to enable a normal charging current to flow.

In block 708, the controller determines whether the charging condition has expired, e.g., whether any of the cell voltages has reached the maximum cell voltage threshold OM. (A voltage-balancing technique may optionally be used to redistribute the charge from the strongest cells to the weaker cells, in which case charging may continue until each of the cell voltages has reached the maximum threshold.) If the individual cell voltages are not available to the controller, the controller may compare the positive power pin voltage VBT to a maximum voltage threshold. Once the charging condition expires, the controller de-asserts the charge monitor pin CHG in block 709.

In block 710, the controller determines whether a discharge condition exists, e.g., whether a load is connected and whether each of the battery cell voltages exceeds a minimum operating threshold $\theta_O$. Any suitable technique can be used to detect whether a load is connected, such as a physical switch, sensor, bus communication, or by comparing the load monitor voltage to the positive power pin voltage VBT. If the individual cell voltages are not available to the controller, the controller may compare the power pin voltage VBT to a minimum operating voltage threshold. In the absence of a connected load or a sufficient battery voltage, the controller disables discharging in block 711, e.g., by de-asserting the discharge transistor control pin DSG.

Otherwise, in block 712, the controller determines whether discharging is currently disabled, and if so, performs a pre-discharge phase in block 713 before setting the discharge transistor control pin DSG voltage to fully enable the discharge transistor in block 715. Otherwise, the controller maintains the state of the discharge transistor in block 715 and returns to block 703.

In block 722, the controller begins in an idle state with the charge transistor control pin CHG and discharge transistor control pin DSG disabled. Any bypass paths are also disabled. Block 723 represents any fault (e.g., excessive current flow, excessive temperature, short circuit) detection by the controller, which returns the controller to the idle state 722. In block 724, the controller determines whether a pre-charge condition exists, e.g., whether a charger is connected and whether any of the battery cell voltages are below the depletion threshold. If the individual cell voltages are not available to the controller, the controller may instead compare the power pin voltage VBT to a suitable depletion threshold value. The charger connection may optionally be determined by comparing the voltage on the charge monitor pin CHM to the negative power pin voltage GND. If a precharge condition exists, the controller performs trickle charging in block 725.

Otherwise in block 726, the controller determines whether a charging condition exists, e.g., whether a charger is connected and each of the battery cell voltages are in the range between the depletion threshold and the maximum cell voltage. If the individual cell voltages are not available to the controller, the controller may compare the power pin voltage VBT to suitable depletion and maximum voltage thresholds. If a charge condition exists, the controller asserts the charge transistor control pin CHG in block 727 to enable a normal charging current to flow.

In block 728, the controller determines whether the charging condition has expired, e.g., whether the charger has been disconnected or if any of the cell voltages has reached the maximum voltage threshold. If voltage balancing is provided, the charging may continue until each of the cells has reached the maximum voltage threshold. If the individual cell voltages are not available to the controller, the controller may use a suitable maximum voltage threshold for comparison with the power pin voltage VBT. If the charging condition has expired, the controller de-asserts the charge monitor pin CHG in block 729.

In block 730, the controller determines whether a discharge condition exists, e.g., whether a load is connected and whether each of the battery cell voltages exceeds a minimum operating threshold $\theta_O$. Any suitable technique can be used to detect whether a load is connected, such as a physical switch, sensor, bus communication, or by comparing the load monitor voltage LDM to the negative power pin voltage GND. If the individual cell voltages are not available to the controller, the controller may compare the power pin voltage VBT to a minimum operating voltage threshold. In the absence of a connected load or a sufficient battery voltage, the controller disables discharging in block 731, e.g., by de-asserting the discharge transistor control pin DSG.

Otherwise, in block 732, the controller determines whether discharging is currently disabled, and if so, performs a pre-discharge phase in block 733 before setting the discharge transistor control pin DSG voltage to fully enable the discharge transistor in block 735. Otherwise, the controller maintains the state of the discharge transistor in block 735 and returns to block 723.

Though the operations shown and described in FIG. 7 are treated as being sequential for explanatory purposes, in practice the method may be carried out by multiple integrated circuit components operating concurrently. The sequential discussion is not meant to be limiting. These and other modifications, equivalents, and alternatives, will become apparent to those of ordinary skill in the art once the above disclosure is fully appreciated. It is intended that the following claims be interpreted to embrace all such modifications, equivalents, and alternatives where applicable.

What is claimed is:

1. A battery pack controller that comprises:
a monitor circuit that couples to a battery pack load terminal to detect when a voltage of the battery pack load terminal indicates a load condition;
a fault detection circuit that couples to a current path through an array of one or more battery cells to detect when a current indicates a fault condition;
a switch control circuit that selectively de-asserts a discharge transistor control pin, asserts the discharge transistor control pin, and ramps a voltage or current of the discharge transistor control pin in an open loop fashion for at least 10 ms; and
a status detection circuit that in the absence of a fault condition causes the switch control circuit to perform said ramping responsive to detection of the load condition while the discharge transistor control pin is de-asserted,
wherein the monitor circuit further couples to a battery pack charge terminal that is shared with or separate from the battery pack load terminal to detect when a voltage of the battery pack charge terminal indicates a charge condition, wherein the switch control circuit selectively de-asserts a charge transistor control pin, asserts the charge transistor control pin, and partially asserts the charge transistor control pin for at least 30 s, and
wherein, responsive to the detection of the charge condition, the status detection circuit causes the switch control circuit to partially assert the charge transistor control pin if the array of one or more battery cells is depleted and otherwise causes the switch control circuit to assert the charge transistor control pin.

2. The battery pack controller of claim 1, wherein the status detection circuit causes the switch control circuit to de-assert the discharge transistor control pin when the fault condition is detected.

3. The battery pack controller of claim 1, wherein the switch control circuit ramps the voltage or current by charging or discharging a capacitance via a resistance.

4. The battery pack controller of claim 1, wherein the switch control circuit ramps the voltage or current by charging or discharging a capacitance using a current source or current sink.

5. The battery pack controller of claim 1, wherein the switch control circuit uses a charge pump to generate a drive voltage for asserting or partially asserting the charge transistor control pin.

6. The battery pack controller of claim 5, wherein the status detection circuit uses a feedback loop to regulate the drive voltage for partially asserting the charge transistor control pin.

7. A battery pack control method that comprises:
monitoring a current path through an array of one or more battery cells for a fault condition;
monitoring a battery pack load terminal to detect when a voltage of the battery pack load terminal indicates a load condition;
monitoring a battery pack charge terminal to detect when a voltage of the battery pack charge terminal indicates a charge condition;
responsive to detecting the load condition and in the absence of a fault condition, asserting a discharge transistor control pin after ramping a voltage or current of a discharge transistor control pin for at least 10 ms; and
responsive to detecting the charge condition, partially asserting a charge transistor control pin for at least 30 s if the array of one or more battery cells is depleted and otherwise asserting the charge transistor control pin.

8. The battery pack control method of claim 7, further comprising de-asserting the discharge transistor control pin when the fault condition is detected.

9. The battery pack control method of claim 7, wherein said ramping includes charging or discharging a capacitance via a resistance.

10. The battery pack control method of claim 7, wherein said ramping includes charging or discharging a capacitance using a current source or current sink.

11. The battery pack control method of claim 7, wherein a charge pump generates a drive voltage for asserting or partially asserting the charge transistor control pin.

12. The battery pack control method of claim 11, further comprising regulating the drive voltage using a feedback loop.

13. The battery pack control method of claim 7, wherein the battery pack load terminal is separate from the battery pack charge terminal.

14. The battery pack control method of claim 13, wherein the load condition is indicated by the voltage of the battery pack load terminal being below a battery cell array voltage.

15. The battery pack control method of claim 14, wherein the charge condition is indicated by the voltage of the battery pack charge terminal being above the battery cell array voltage.

16. The battery pack control method of claim 13, wherein the load condition is indicated by the voltage of the battery pack load terminal being positive.

17. The battery pack control method of claim 14, wherein the charge condition is indicated by the voltage of the battery pack charge terminal being negative.

18. The battery pack control method of claim 7, wherein the battery pack load terminal is shared with the battery pack charge terminal.

19. The battery pack control method of claim 18, wherein the load condition is indicated by the voltage of the battery pack load terminal being below a battery cell array voltage.

20. The battery pack control method of claim 19, wherein the charge condition is indicated by the voltage of the battery pack charge terminal being above the battery cell array voltage.

21. The battery pack control method of claim 18, wherein the load condition is indicated by the voltage of the battery pack load terminal being positive.

22. The battery pack control method of claim 21, wherein the charge condition is indicated by the voltage of the battery pack charge terminal being negative.

23. A battery pack that comprises:

a battery cell array;

a charge transistor configured to control a charging current flow to the battery cell array from a battery pack charge terminal;

a discharge transistor configured to control a load current flow from the battery cell array to a battery pack load terminal;

a battery pack controller that includes:

a fault detection circuit configured to detect a fault condition of the battery cell array;

a monitor circuit configured to detect when a voltage of the battery pack load terminal indicates a load condition and configured to detect when a voltage of the battery pack charge terminal indicates a charge condition;

a switch control circuit configured to selectively de-assert a discharge transistor control pin, assert the discharge transistor control pin, and ramp a voltage or current of the discharge transistor control pin in an open loop fashion for at least 10 ms, and configured to selectively de-assert a charge transistor control pin, assert the charge transistor control pin, and partially assert the charge transistor control pin for at least 30 s; and a status detection circuit configured to, in the absence of the fault condition, cause the switch control circuit to perform said ramping responsive to detection of the load condition while the discharge transistor control pin is de-asserted, and, responsive to detection of the charge condition, to cause the switch control circuit to partially assert the charge transistor control pin for at least 30 s if the battery cell array is depleted and otherwise to cause the switch control circuit to assert the charge transistor control pin.

24. The battery pack of claim 23, wherein the switch control circuit is configured to use a charge pump to generate a drive voltage for asserting or partially asserting the charge transistor control pin, and wherein the status detection circuit is configured to regulate the drive voltage with a feedback loop for partially asserting the charge transistor control pin.

25. The battery pack of claim 24, wherein the switch control circuit is configured to de-assert the discharge transistor control pin when the fault condition is detected.

26. The battery pack of claim 23, wherein the load condition is indicated by the voltage of the battery pack load terminal being positive, and wherein the charge condition is indicated by the voltage of the battery pack charge terminal being negative.

\*    \*    \*    \*    \*